United States Patent [19]
Lestraden

[11] 4,125,949
[45] Nov. 21, 1978

[54] COMPARTMENTALIZATION IN A TREATMENT ROOM

[76] Inventor: Jacobus J. W. Lestraden, 4, Nachtegaallaan, Sassenheim, Netherlands

[21] Appl. No.: 773,972

[22] Filed: Mar. 3, 1977

[30] Foreign Application Priority Data

Mar. 4, 1976 [NL] Netherlands .......................... 7602243

[51] Int. Cl.² ...................... F26B 25/06; F25D 17/06
[52] U.S. Cl. ........................................ 34/231; 52/238; 62/417; 105/376
[58] Field of Search ..................... 34/34, 231; 52/238, 52/64; 49/224; 105/376; 62/417

[56] References Cited

U.S. PATENT DOCUMENTS

| 1,704,758 | 3/1929 | Meinhardt | 105/376 |
| 2,677,246 | 5/1954 | Wehby | 62/417 X |
| 3,384,034 | 5/1968 | Loomis et al. | 105/376 |
| 3,744,184 | 7/1973 | Niemi et al. | 105/376 X |

*Primary Examiner*—William E. Wayner
*Attorney, Agent, or Firm*—Morgan, Finnegan, Pine, Foley & Lee

[57] ABSTRACT

There is provided a room for the treatment or storage of products, the room having vertical walls along one or more stacks on which the products are arranged the walls providing air currents of a certain pattern, controlled by the stacks, the walls further being displaceable at right angles to their vertical dimension, so as to make the stacks accessible to a transport means, for example, a fork lift truck.

5 Claims, 2 Drawing Figures

COMPARTMENTALIZATION IN A TREATMENT ROOM

The invention relates to a room for the treatment or storage of products wherein a forced air current is produced through and along the products situated in stacks in the treatment room.

In order to ensure that a controlled air current is obtained through the stacks of the containers which hold the products to be treated, these stacks must be screened off sideways, but so that it remains possible to remove or stack these containers, which are placed on pallets, for example by means of a fork lift truck.

The object of the invention is to achieve this aim, and according to the invention the room has vertical walls along one or more of the stacks whereby air currents of a certain pattern can be produced controlled by the stacks, where these walls can be displaced at right angles to their vertical dimension so as to make the containers accessible to a transport means, for example a fork lift truck.

The invention will be explained with the help of the drawings.

It appears from the figure that it must be possible to shut off the stacks 1, 1' and 1" separately by means of compartmentalization walls 2, which can be displaced in horizontal direction according to the arrows.

When a compartmentalization wall 2 is shoved away from the stacks, a fork lift truck can then, in the spaces between the stacks, take in or remove the products from the stacks which are on pallets.

Figure 1:
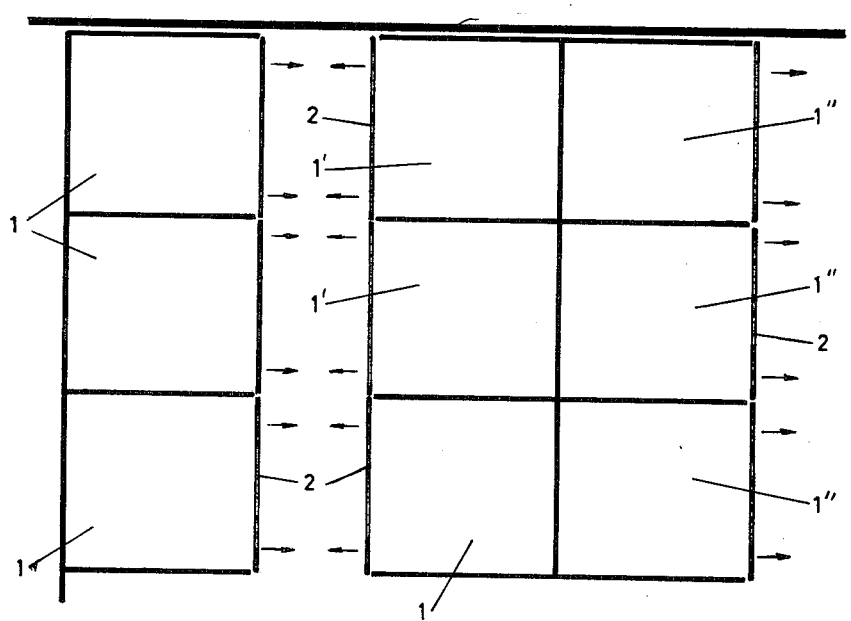
FIG. 1 shows a ground plan of a part of the room with the stacks.
Figure 2:
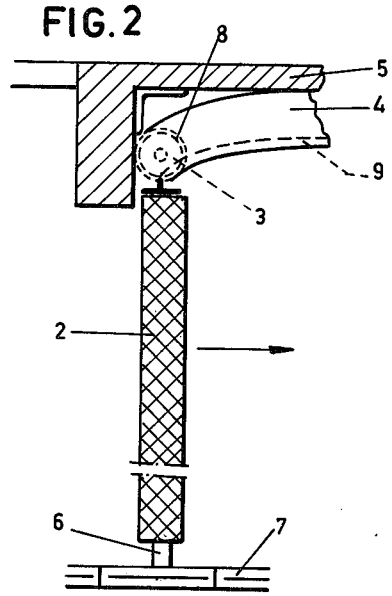
FIG. 2 shows a cross section through a compartmentalization wall.

This compartmentalization wall 2, with the direction of movement indicated by an arrow, is illustrated in FIG. 2 on a larger scale.

The wall 2 has on top a number of bogie wheels 3 which can move in the horizontal direction along a number of horizontal rails 4 mounted, for example, against the ceiling 5.

The wall 2 has at its bottom a sealing strip 6 which, in the position adjoining the stacks, bears against the floor 7 whereby a good sealing is guaranteed.

Next to one or more bogie wheels a pinion 8 is placed which is rotated by a reversible electromotor, and this pionion is in engagement with a gear rack 9 mounted along the horizontal rail 4.

The wall 2 can then be displaced by switching on the electromotor in a given direction.

From the figure it also appears that the rail 4 and thereby the gear rack 9 are curved downwards at the end of the path, on the one hand to make possible the sealing against the floor, on the other hand to enable the wall 2 to move free of the floor.

I claim:

1. In a room for the treatment or storage of products wherein a forced air current is set up through and along the products situated in stacks in the treatment room, vertical compartmentalization walls mounted along one or more stacks to produce air currents of a given pattern controlled by the stacks, said walls being displaceable at right angles to their vertical dimension so as to make the stacks accessible to a transport means and wherein said wall are adapted to be driven along a horizontal top rail by a reversible electromotor, a pinion of which is in engagement with a gear rack mounted along the rail.

2. A room as defined in claim 1 wherein said walls are at least large enough so as to make the stacks accessible to a fork lift truck.

3. In a room for the treatment or storage of products wherein a forced air current is set up through and along the products situated in stacks in the treatment room, at least one vertical compartmentalization wall mounted along one or more stacks to produce air currents of a given pattern controlled by the stacks, said wall being displaceable at right angles to its vertical dimension so as to make the stacks accessible to a transport means, at least one substantially horizontal rail on which said wall is mounted and in which in the closed end position, adjoining the stacks, is provided with a dropping portion, and a sealing strip at the bottom of said wall adapted to bear against the floor when the wall is in the closed state.

4. A room as defined in claim 3 wherein each said wall is adapted to be driven along said horizontal top rail by a reversible electromotor, a pinion of which is in engagement with a gear rack mounted along the rail.

5. A room as defined in claim 3 wherein said wall is at least large enough so as to make the stacks accessible to a fork lift truck.